United States Patent
Dreger et al.

(10) Patent No.: US 11,403,384 B2
(45) Date of Patent: Aug. 2, 2022

(54) ACCESS CONTROL

(71) Applicant: SIEMENS AKTIENGESELLSCHAFT, Munich (DE)

(72) Inventors: Holger Dreger, Munich (DE); Gerhard Münz, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/088,463

(22) PCT Filed: Feb. 28, 2017

(86) PCT No.: PCT/EP2017/054600
§ 371 (c)(1),
(2) Date: Sep. 26, 2018

(87) PCT Pub. No.: WO2017/167519
PCT Pub. Date: Oct. 5, 2017

(65) Prior Publication Data
US 2019/0114409 A1    Apr. 18, 2019

(30) Foreign Application Priority Data

Mar. 29, 2016 (DE) ............... 10 2016 205 091.5

(51) Int. Cl.
*G06F 21/00* (2013.01)
*G06F 21/34* (2013.01)
(Continued)

(52) U.S. Cl.
CPC ............ *G06F 21/34* (2013.01); *G06F 1/3231* (2013.01); *G06F 3/021* (2013.01); *G06F 21/82* (2013.01);
(Continued)

(58) Field of Classification Search
CPC ........ G06F 21/34; G06F 21/82; G06F 1/3231; G06F 3/021; G06F 13/4282; G06F 2213/0002; G06F 2213/0042
See application file for complete search history.

(56) References Cited

U.S. PATENT DOCUMENTS 7,107,455 B1 *  9/2006  Merkin ................ H04W 12/08
                                                            713/182
7,877,788 B1    1/2011  Topp et al.
(Continued)

FOREIGN PATENT DOCUMENTS

CN    101719295 A    6/2010
CN    107424098 A    12/2017
(Continued)

OTHER PUBLICATIONS

Radio-Frequency Indentification (RFID), see Wikipedia https://en.wikipedia.org/wiki/Radio-frequency_identification Retrieved Mar. 29, 2016.
(Continued)

*Primary Examiner* — Jeffrey C Pwu
*Assistant Examiner* — William A Corum, Jr.
(74) *Attorney, Agent, or Firm* — Schmeiser, Olsen & Watts LLP

(57) ABSTRACT

An access control apparatus is provided. The apparatus can be used to unlock a device, wherein the device has a computation unit and at least one operator control unit that is electrically connectable to the computation unit, wherein the apparatus has a first reception unit for receiving electrical signals from the at least one operator control unit, a transmission unit for transmitting the electrical signals to the computation unit, a second reception unit for receiving at least one access message transmitted by means of an electromagnetic signal, an authorization unit for generating a switching signal if the result of the check on the access
(Continued)

message is that unlocking of the device is permitted by means of the access message, and an unlocking unit for unlocking a transmission of electrical signals from the first reception unit to the transmission unit on the basis of the switching signal.

8 Claims, 1 Drawing Sheet

(51) Int. Cl.
    *G06F 3/02*         (2006.01)
    *G06F 21/82*       (2013.01)
    *G06F 1/3231*     (2019.01)
    *G06F 13/42*       (2006.01)

(52) U.S. Cl.
    CPC .. *G06F 13/4282* (2013.01); *G06F 2213/0002* (2013.01); *G06F 2213/0042* (2013.01)

(56) References Cited

U.S. PATENT DOCUMENTS

| | | | |
|---|---|---|---|
| 2002/0038427 A1* | 3/2002 | Krieger | G06F 3/03543 713/186 |
| 2006/0136717 A1* | 6/2006 | Buer | H04L 9/3234 713/155 |
| 2007/0015463 A1 | 1/2007 | Abel et al. | |
| 2007/0057763 A1* | 3/2007 | Blattner | G06K 9/00013 340/5.52 |
| 2007/0186105 A1 | 8/2007 | Bailey et al. | |
| 2012/0030752 A1 | 2/2012 | Bruno et al. | |
| 2012/0323717 A1 | 12/2012 | Kirsch | |
| 2018/0096547 A1* | 4/2018 | Robertson | G06F 21/34 |
| 2018/0225230 A1* | 8/2018 | Litichever | G06F 21/56 |

FOREIGN PATENT DOCUMENTS

| | | |
|---|---|---|
| DE | 102004036366 A1 | 3/2006 |
| WO | WO 2013127521 A1 | 9/2013 |

OTHER PUBLICATIONS

International Search Report for PCT/EP2017/054600.
International Search Report dated May 29, 2017 for PCT/EP2017/054600.
Search Report in related German Patent Application No. 10 2016 205 091.5 dated Feb. 17, 2017. 8 pages.
Office Action in related Chinese Patent Application No. 201780021007.3 dated Sep. 8, 2021. 15 pages.

* cited by examiner

ACCESS CONTROL

CROSS-REFERENCE TO RELATED APPLICATIONS

This application claims priority to PCT Application No. PCT/EP2017/054600, having a filing date of Feb. 28, 2017, based on German Application No. 10 2016 205 091.5, having a filing date of Mar. 29, 2016, the entire contents both of which are hereby incorporated by reference.

FIELD OF TECHNOLOGY

The following relates to an apparatus for unlocking a device for providing access control.

BACKGROUND

An increasing use of IT-based devices, subsequently referred to as an IT system, in everyday work means that a user frequently faces using multiple IT systems, such as, for example, personal computers, robot installations, controllers in automation installations, conveyor belts and further equipment operated by means of IT engineering, during his working day. In order to increase security relating to the unauthorized use of these IT systems, a password is requested from a user as standard today before the IT system is actually used. This password can then be input in the respective IT system using the keyboard.

However, it is found that users who alternate IT systems more frequently often remain permanently logged in on the respective IT system with their password, which compromises the security originally initiated by the password.

Changing over from existing IT systems to support further or different authentication measures for manual password input using a keyboard often requires a software adjustment on the respective IT system. Particularly in the case of older IT systems or IT systems that constantly exchange data with further IT systems, a software-based adjustment of this kind may be difficult, may possibly be technically infeasible, may lead to operation of the IT system becoming unstable or may imply exclusions of liability for the supplier.

SUMMARY

An aspect relates to an apparatus for unlocking a device that firstly provides for unlocking of the device by a user in a simple and easily usable manner and avoids endangering the IT system through the use of the apparatus.

The following relates to an apparatus for unlocking a device, wherein the device has a computation unit and at least one operator control unit, which is electrically connectable to the computation unit, characterized in that the apparatus has the following units:
a) first reception unit for receiving electrical signals from the at least one operator control unit;
b) transmission unit for transmitting the electrical signals to the computation unit;
c) second reception unit for receiving at least one access message transmitted by means of an electromagnetic signal;
d) authorization unit for generating a switching signal if a check on the access message reveals that unlocking of the device is permitted by means of the access message;
e) unlock unit for unlocking a transmission of the electrical signals from the first reception unit to the transmission unit on the basis of the switching signal.

The apparatus has the advantage that for an existing IT system, for example in the form of the device, an improvement in access security relating to the device can be achieved without the need to make a software alteration on the device. Further, the apparatus can be put into operation without any negative effect on the device. A further advantage of embodiments of the invention is that it can be realized and put into operation with little complexity. Moreover, the apparatus can also realize a multilevel security concept. In this case, there may be at least two different messages that are receivable by the second reception unit and evaluable by the authorization unit. As such, when a first access message is received, access can be granted only for one specific operator control unit, e.g. only for the keyboard, and when a second access message is received, access can be allowed only for multiple operator control units, such as keyboard and mouse. By way of example, using the mouse also provides control options on the computation unit that are not possible using the keyboard.

In a preferable development of embodiments of the invention, the at least one operator control unit is configured as a keyboard or mouse. This allows very common operator control units to be security protected against misuse by means of the apparatus.

In a preferable configuration of embodiments of the invention, the first reception unit is designed to receive the electrical signals (a) by means of an electrically conductive cable (KA1), wherein the electrical signals (ESIG) are coded in particular on the basis of a USB (Universal Serial Bus), PS/2 or RS-232 standard, or (b) wirelessly. This allows inexpensive and very widely used operator control units to be used with and protected against misuse by means of the apparatus.

In an optional development of embodiments of the invention, the transmission unit is connectable to the computation unit via a further electrically conductive cable or wirelessly for the purpose of exchanging the electrical signals, in particular according to a USB (Universal Serial Bus), PS/2 or RS-232 standard. As a result, the apparatus is usable on a large number of computation units, since many of the IT systems popular at present provide interfaces in the claimed manner. Moreover, this can allow the apparatus to be produced inexpensively.

In a preferable development of embodiments of the invention, the apparatus further has the further cable, which is inseparably connected to the apparatus. The inseparable connection of the further cable to the apparatus hampers manipulation of the apparatus further. Within the context of this specification, inseparable is generally intended to be understood to mean that the further cable is not connected to the apparatus by means of a separable plug connection, but rather separating the further cable requires said cable to be cut, for example.

A further increase in security can be achieved in an optional development of the apparatus by virtue of the apparatus being at least partly arranged inside a casing, and the computation unit being arranged inside the casing. This hampers access to the apparatus greatly, because first of all the casing, for example a switchgear cabinet or a computer housing, needs to be opened in order to be able to perform a manipulation on the apparatus.

In an alternative embodiment of the invention, the apparatus may at least partly be arranged inside the at least one operator control unit. This is advantageous because this allows a compact design comprising the operator control unit and the apparatus to be achieved. Further, this hampers a manipulation, since the cable between the first reception unit of the apparatus and the operator control unit is arranged in the housing of the operator control unit and this hampers manipulation of the cable for an attacker. A further advantage lies in the fact that installation of the apparatus is facilitated, since a user installs the operator control unit with the apparatus like an ordinary operator control unit, e.g. a keyboard or mouse.

BRIEF DESCRIPTION

Some of the embodiments will be described in detail, with references to the following Figures, wherein like designations denote like members, wherein.

DETAILED DESCRIPTION

Elements having the same function and mode of action are provided with the same reference signs in the figures.

Figure 1:
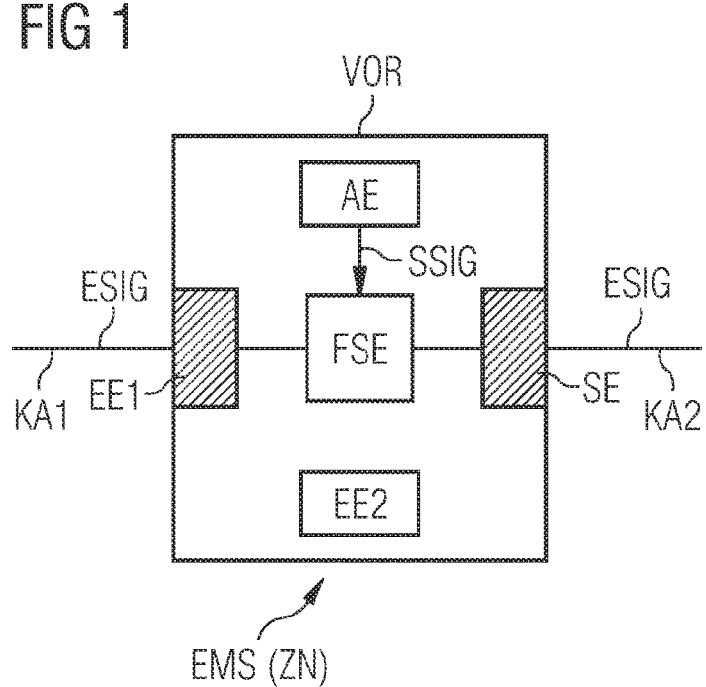
FIG. 1 shows a block diagram of an embodiment of the apparatus.

FIG. 1 shows an exemplary design of the apparatus VOR. The apparatus uses a first reception unit EE1 to receive an electrical signal ESIG, for example from at least one operator control unit BE. The operator control unit BE is configured as a keyboard or mouse, for example. As such, the first reception unit EE1 may be configured, by way of example, in the form of a USB (Universal Serial Bus) port or a PS/2 port that can electrically receive the appropriate connector of a cable KA1 connected to the operator control unit. The signals from the operator control unit, for example the x-y coordinates or a respective push of a key on the mouse, can be received as an electrical signal ESIG by the reception unit EE1 via the cable KA1.

Portrayed on the right-hand side of the apparatus VOR is a transmission unit SE designed for transmitting the electrical signal ESIG to a computation unit RE. As such, the transmission unit of the apparatus can have a USB socket or PS/2 socket in which a further cable KA2 between the apparatus and the computation unit may be configured for transmitting the electrical signal.

Arranged inside the apparatus is an unlock unit FSE that can take a switching signal SSIG as a basis for transmitting the electrical signal from the first reception unit EE1 to the transmission unit SE and optionally also in the other direction.

The switching signal SSIG is generated by an authorization unit AE, which is designed from a second reception unit EE2, for receiving at least one access message ZN, and transmitted. The second reception unit EE2 receives the access message ZN by means of an electromagnetic signal EMS sent, for example, by a token on the clothing of the user as soon as the user is in proximity to the apparatus VOR.

Figure 2:
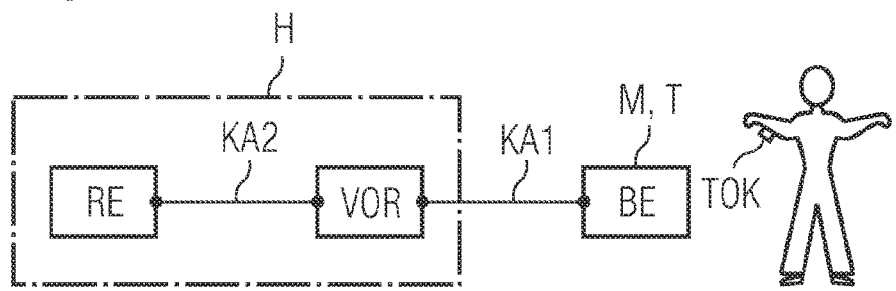
FIG. 2 shows block diagram of an exemplary embodiment of the invention.

FIG. 2 shows an exemplary embodiment of the invention. In this situation, the apparatus is installed in a casing such as an enclosed switchgear cabinet in which the computation unit is also accommodated. Alternatively, the apparatus may also be accommodated in a casing such as a housing that surrounds the computation unit. Advantageously, a user can plug his keyboard and his mouse into the apparatus without opening the switchgear cabinet or the housing, e.g. via a small opening in the casing. Inside the casing, the further cable KA2 is electrically connected between the transmission unit and that socket of the computation unit that is responsible for the keyboard or mouse. To avoid manipulation, the further cable KA2 should be arranged in the housing such that it is not manipulable from the outside, for example cannot be removed from the computation unit.

A person wears a token TOK on his arm. The token emits the electromagnetic signal EMS with an access message ZN. This token can be transmitted together with the second reception unit the access message ZN in the form of an RFID (radio frequency identification) technology, see [1]. Preferably, the access message ZN is receivable correctly by the second reception unit only in direct proximity to the apparatus or operator control unit, for example at a distance of 3 meters or less. Preferably, the token becomes active only when it is brought into proximity to the apparatus. The token may be designed as a transponder that sends not of its own accord but rather when it is wirelessly supplied with power by the second reception unit. The token may be designed in card form, which the user fastens to his clothing as part of his company ID. In another embodiment, the token is designed as a tag for a key fob. Moreover, the token may be sewn into or put onto, for example ironed onto, an item of work clothing.

If the person with the token approaches the operator control unit and/or apparatus, the access message ZN is received by the second reception unit correctly and forwarded to the authorization unit AE for checking. If, on the basis of the access message, the authorization unit can identify that the user is approved for access to the computation unit, it sends the switching signal SSIG to the unlock unit FSE, which electrically connects the first reception unit and the transmission unit for the exchange of electrical signals.

Thereafter, the user is capable of exchanging information between keyboard and mouse with the computer either without inputting or by inputting a password, depending on the state of the computer. In general, for all embodiments of the inventions, it holds that the first reception unit and the transmission unit can each receive and/or send electrical signals.

Electrical signals are in general intended to be understood to mean power supply signals such as 5V or 12V, and signals for transmitting information or a ground signal. In this regard, the first reception unit and/or the transmission unit can have multiple contacts in order to transmit the electrical signal via multiple cords of the cable or of the further cable. Further, in general, the electrical signal can be subjected to a protocol conversion by the unlock unit from the first reception unit to the transmission unit and optionally also in the opposite direction. By way of example, the electrical signal is coded according to USB specification 1.1 between computer and apparatus and according to RS-232 (RS-232: standard for serial transmission of communication data, see TIA-232-F standard) between apparatus and operator control unit. In this case, the unlock unit converts the signals of the USB1.1 specification into those of the RS-232 standard and possibly also vice versa.

In a modification of this exemplary embodiment, one end of the further cable KA2 is inseparably connected to the apparatus. The other end of the further cable is connected to the computation unit such that it cannot be removed by a user. As such, the casing may be in a form such that the further cable is able to be passed through the casing, but the user cannot grasp the plug connection between the further end of the cable and the computation unit. Alternatively, the other end of the further cable is also inseparably connected to the computer, in which case the casing extends over the plug connection at the other end of the cable.

In a further embodiment of the invention, the apparatus is part of the operator control unit. As such, the apparatus may have been introduced into the housing of the keyboard or of the mouse, the further cable possibly being embodied so as to be inseparable from the apparatus or the housing of the operator control unit. In a further configuration of this embodiment, instead of the further cable KA2, the connection between the apparatus and the computation unit may also be configured in wireless form, a coupling to the computation unit being prescribed a priori of authenticity of the operator control unit. As such, the electrical signal may be encrypted, so that only the operator control unit and the computer can decrypt it and interpret it correctly.

The individual units of the apparatus may be connected to one another via a bus for the purpose of exchanging messages. Further, the individual units can be configured and embodied at least partially in software, hardware or in a combination of software and hardware. For the configuration and embodiment, a processor, such as a microcontroller, for example, can undertake coordination of the individual units.

The embodiment and developments thereof are able to be used inter alia in security-critical installations, such as a computer center, a substation of a power supplier, in production installations or else in a hospital.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. An apparatus for unlocking a device including a computation unit and at least one operator control unit electrically connectable to the computation unit, the apparatus comprising:
   a) a first reception unit for receiving electrical signals from a first cable connectable to the at least one operator control unit;
   b) a transmission unit for transmitting the electrical signals to the computation unit via a second cable;
   c) a second reception unit for receiving at least one access message transmitted wirelessly by a wearable token device;
   d) an authorization unit for generating a switching signal if a check on the at least one access message sent to the authorization unit from the second reception unit reveals that unlocking of the device is permitted by means of the at least one access message; and
   e) an unlock unit for electrically connecting the first reception unit to the transmission unit to establish an exchange of electrical signals between the first reception unit and the transmission unit, on a basis of the switching signal, wherein establishing the exchange of electrical signals allows an operator to control the computation unit using the at least one operator control unit.

2. The apparatus as claimed in claim 1, wherein the at least one operator control unit is designed as a keyboard or a mouse.

3. The apparatus as claimed in claim 1, wherein the first cable is an electrically conductive cable, wherein the electrical signals are coded on a basis of a Universal Serial Bus (USB), PS/2 or RS-232 standard.

4. The apparatus as claimed in claim 1, wherein the transmission unit is connectable to the computation unit via the second cable, which is an electrically conductive cable, according to a USB, PS/2 or RS-232 standard.

5. The apparatus as claimed in claim 1, wherein the second cable is inseparably connected to the apparatus.

6. The apparatus as claimed in claim 1, wherein the apparatus is at least partly arranged inside a casing and the computation unit is arranged inside the casing.

7. The apparatus as claimed in claim 1, wherein the apparatus is at least partly arranged inside the at least one operator control unit.

8. The apparatus as claimed in claim 1, wherein the unlock unit electrically connects the first cable to the second cable via the first reception unit and the transmission unit.

* * * * *